United States Patent Office
3,796,635
Patented Mar. 12, 1974

3,796,635
PROCESS FOR THE PREPARATION OF HEAT RESISTANT NEUTRAL PROTEASE ENZYME
Jacques J. Delente, St. Louis, Mo., assignor to Monsanto Company, St. Louis, Mo.
No Drawing. Continuation-in-part of abandoned application Ser. No. 102,153, Dec. 28, 1970. This application Dec. 26, 1972, Ser. No. 318,127
Int. Cl. C12d 13/10
U.S. Cl. 195—65    6 Claims

ABSTRACT OF THE DISCLOSURE

The production of neutral protease enzyme in high yields is accomplished by cultivating a strain of Bacillus stearothermophilus (strain I-8100) in an aqueous nutrient fermentation medium. Such culturing produces neutral protease which has optimum enzymatic activity at 70–80° C.

REFERENCE TO RELATED APPLICATIONS

This application is a continuation-in-part of copending application Ser. No. 102,153, filed on Dec. 28, 1970, now abandoned.

BACKGROUND OF THE INVENTION

Field of the invention

This invention relates to the preparation of neutral protease enzyme. In a more particular aspect this invention relates to the preparation of heat resistant neutral protease enzyme in high yields, the enzyme having endopeptidase activity. In a more particular aspect this invention relates to the preparation of heat resistant neutral protease enzyme with endopeptidase activity in high yields by fermentation with a strain of Bacillus stearothermophilus.

Description of the prior art

Protease enzymes and their production by fermentation with microorganisms are well known to the art. For example, numerous strains of Bacillus subtilis are known to produce neutral and alkaline proteases. Acid protease is obtained from strains of Aspergillus niger. A common property among many protease enzymes is poor thermostability. In general optimum enzymatic activity is at temperatures in the range of from about 37 to about 45° C. with the activity being adversely affected by higher temperatures.

It has become known that a strain of Bacillus stearothermophilus identified as strain A-10 when cultivated in a nutrient fermentation medium produces a heat resistant (thermally stable) neutral protease which has optimum enzymatic activity at temperatures in the range of from about 70 to about 80° C. More recently it has become known that neutral protease having thermastability characteristics similar to the enzyme obtained from the Bacillus stearothermophilus strain A-10 is obtained in higher yields from a strain of Bacillus thermoproteolyticus identified as the Rokko strain.

Despite the high potency of neutral protease preparations obtained with Bacillus thermoproteolyticus (Rokko) the need to further increase the yield of thermally stable neutral protease preparations is well recognized.

It is also known from G. Roncari and H. Zuber "Methods in Enzymology," vol. 19 (1970), pp. 544–552 that certain strains of Bacillus stearothermophilus produce thermostable aminopeptidases. Aminopeptidase enzymes have exopeptidase activity which is the ability to split amino acids from the amino end of polypeptides. This is in contrast with neutral protease enzymes which have endopeptidase activity, endopeptidase activity being the ability to act on the central peptide bonds of proteins and substituted peptides. Endopeptidase enzymes are readily distinguished from exopeptidase enzymes by gelatin liquefaction tests. Endopeptidase liquefy gelatin whereas exopeptidases do not liquefy gelatin. The strain of Bacillus stearothermophilus employed in the reported Roncari and Zuber work (strain NCIB 8924) was previously reported by P. J. Donk in J. Bact. 5 (1920), p. 373–374. Donk reports that the enzyme from this strain of B. stearothermophilus does not liquefy gelatin.

OBJECTS

It is an object of the present invention to provide a process for the preparation of heat resistance neutral protease enzyme having endopeptidase activity.

It is a further object of the present invention to provide a process for the preparation of heat resistant neutral protease enzyme with endopeptidase activity in improved yields.

Other objects and advantages of the present invention will be apparent from the specification and appended claims.

SUMMARY OF THE INVENTION

The present invention resides in the discovery that heat resistant neutral protease enzyme having endopeptidase activity is obtained in high yields by cultivating in an aqueous nutrient fermentation medium the microorganism Bacillus stearothermophilus (variety I-8100). The enzyme liquefies gelatin. A culture of the microorganism was deposited in the culture collection of Northern Utilization Research and Development Division, Agricultural Research and Development Division, Agricultural Research Service, United States Department of Agriculture in Peoria, Ill. on Nov. 13, 1970, and was assigned the Culture Collection Number NRRL-B-3880.

DETAILED DESCRIPTION

A comparison of the characteristics of Bacillus stearothermophilus (variety I-8100) with characteristics of Bacillus stearothermophilus (variety Rokko) is given in Table I.

TABLE I

| Characteristics: | Rokko | A-10 | I-8100 |
|---|---|---|---|
| Motility | None | None | Motile. |
| H$_2$S | Negative | Negative | Negative. |
| Flagella | None | None | 1 polar. |
| Gram stain | Gram positive | Gram negative | Gram variable. |
| Sporangia | Nonswollen | Swollen | Swollen. |
| Nutrient broth | No chain formation | No chain formation | Long chain formation. |
| Surface growth | None | None | Abundant. |
| Colonies | White, smooth 2 mm. diameter. | White, smooth 2 mm. diameter opaque center spots. | White, smooth 4 mm. diameter opaque center spots. |
| Chromogenesis | None | None | Pink old (48 hour) colonies. |
| Indole | | Negative | Negative. |
| Citrate | | do | Do. |
| Urea (Christensen's) | | Positive | Positive. |
| Gelatin | | do | Do. |
| Nitrate | | Negative | Negative. |
| Sucrose | | Positive | Positive. |

The process of the present invention for the production of heat-resistant neutral protease enzyme comprises fermenting a culture of the organism *Bacillus stearothermophilus* variety I–8100 in an aqueous nutrient fermentation medium containing assimilable sources of nitrogen, carbon and nutrient minerals. Fermentation conditions may be of the surface or of the submerged type over a relatively broad pH range (preferably at a pH in the range of from about 6.0 to about 7.5) and preferably at a temperature in the range of from about 50 to about 60° C. The fermentation medium is preferably maintained within the preferred pH and temperature ranges during the entire fermentation which is ordinarily completed in a matter of from about 12 to about 48 hours when conducted under aeration-agitation or shaking conditions.

Sources of carbon which are suitable for use in the fermentation medium include carbohydrate sources such as ground yellow dent corn, white corn, potatoes, starch, sucrose, corn syrup, ground oats, barley, wheat, hydrol and the like. The nitrogen source can be in the organic or inorganic form and may be, for example, corn, oats, barley, wheat, ammonia, urea, suitable ammonium salts, such as ammonium chloride and ammonium sulfate, peptone, corn steep liquor, wheat-bran extracts, soy bean meal, and the like. Mineral salts such as magnesium sulfate, calcium chloride, and dipotassium phosphate are used with desirable results.

On completion of the fermentation the neutral protease preparation is filtered to remove solid material. If desired the enzyme may then be recovered from the fermentation medium by any suitable procedure. Numerous procedures for recovering neutral protease from aqueous fermentation media are known to the art and include the use of ammonium sulfate to salt out the enzyme, the use of ion exchange resins to sorb unwanted impurities, and the use of organic solvents, such as isopropanol and ethanol, to precipitate the enzyme.

The following examples are presented for the purpose of illustration only and are not intended to be restrictive of the invention. It is to be further understood that many modifications are possible in the nutrient medium in which the organism is grown and the technique of fermentation applied without departing from the spirit and scope of the invention.

In the examples activity is expressed in units with one unit of enzyme being that quantity which releases one-half microgram of tyrosine, as measured by Folin reagent, from casein during 10 minutes at 37° C.

EXAMPLE 1

To demonstrate the effectiveness of the organism *Bacillus stearothermophilus* variety I–8100 in the preparation of neutral protease shake flask fermentations were conducted using the *Bacillus stearothermophilus* I–8100 strain and *Bacillus thermoproteolyticus* Rokko. The following procedure was utilized.

A growth from nutrient agar was transferred to a 500-milliliter Erlenmeyer flask containing 100 milliliters of nutrient broth (DIFCO) containing 0.3-gram beef extract and 0.5-gram peptone and having a pH of 6.8. The inoculated flask was incubated for 24 hours at 55° C. on a gyrotary shaker. On completion of the 24-hour period a 1000-milliliter shake flask containing 500 milliliters of sterilized medium (pH 7.2) of the following composition:

|  | Grams |
| --- | --- |
| Corn starch | 15.0 |
| Ground soy bean meal | 7.5 |
| Yeast extract | 1.0 |
| KH$_2$PO$_4$ | 0.5 |
| K$_2$HPO$_4$ | 1.5 |
| MgSO$_4$ | 0.05 |
| CaCl$_2$ | 0.1 |
| Water—as required. | | was inoculated with 25 milliliters of the 24-hour inoculum culture from the Erlenmeyer flask. The contents of the flask were then incubated at 55° C. with shaking and with aeration at a rate of 500 milliliters per minute. In the case of *Bacillus thermoproteolyticus* Rokko optimum activity of neutral protease was obtained in 16 hours. In the case of *Bacillus stearothermophilus* I–8100 optimum activity of neutral protease was obtained in 32 hours. The results are given in Table 2.

TABLE II

| Culture | Bacillus stearothermophilus I–8100 | Bacillus thermoproteolyticus Rokko |
| --- | --- | --- |
| Enzyme activity, units per ml. (optimum) | 32,000 | 10,000 |

The results show that activity of enzyme preparations obtained from *Bacillus stearothermophilus* I–8100 is much higher than those obtained from *Bacillus thermoproteolyticus* Rokko.

EXAMPLE 2

This example shows the production of neutral protease in a large size fermentor using *Bacillus stearothermophilus* I–8100.

Into a 130-liter pressurized fermentor equipped for agitation and aeration were placed 100 liters of medium (pH 7.2) of the following composition:

|  | Kilograms |
| --- | --- |
| Corn starch | 3.0 |
| Ground soy bean meal | 1.5 |
| Yeast extract | 0.2 |
| KH$_2$PO$_4$ | 0.05 |
| K$_2$HPO$_4$ | 0.35 |
| MgSO$_4$ | 0.01 |
| CaCl$_2$ | 0.02 |
| Antifoam (ml.) 100. | |
| Water—as required. | |

The medium was sterilized by heating and then cooled to 57° C. The medium was then inoculated with 3000 milliliters of a 24-hour inoculum of *Bacillus stearothermophilus* I–8100. Agitation was supplied and the medium was aerated at 40 liters of air per minute. After 17 hours of fermentation at 57° C. under 2.5 atmospheres (absolute) pressure the medium was found to have a neutral protease enzyme activity of 29,000 units per milliliters.

Since many embodiments may be made of this invention and since many changes may be made in the embodiments described the foregoing description is to be interpreted as illustrative only and the invention is defined by the appended claims.

What is claimed is:

1. A process for the preparation of neutral protease having endopeptidase activity which comprises cultivating in an aqueous nutrient fermentation medium the organism *Bacillus stearothermophilus* NRRL–B–3880 (I–8100).

2. The process of claim 1 wherein neutral protease having endopeptidase activity is recovered from the medium.

3. The process of claim 1 wherein the nutrient medium contains assimilable sources of carbon, nitrogen and nutrient minerals.

4. The process of claim 1 wherein the pH of the nutrient medium is in the range of from about 6 to about 7.5.

5. The process of claim 1 wherein the temperature of the nutrient medium is in the range of from about 50 to about 60° C.

6. The process of claim 1 wherein neutral protease having endopeptidase activity is recovered from the medium after separation of solids therefrom.

References Cited

Roncari et al., Methods in Enzymology, vol. 19, pp. 544–552 (1970).

Zuber et al., Angewandte Chemie Int., ed. vol. 6 (10), pp. 880–881 (1967).

LIONEL M. SHAPIRO, Primary Examiner